Nov. 18, 1930.  L. W. GREVE  1,782,141
SHOCK ABSORBER
Original Filed April 30, 1928   2 Sheets-Sheet 2
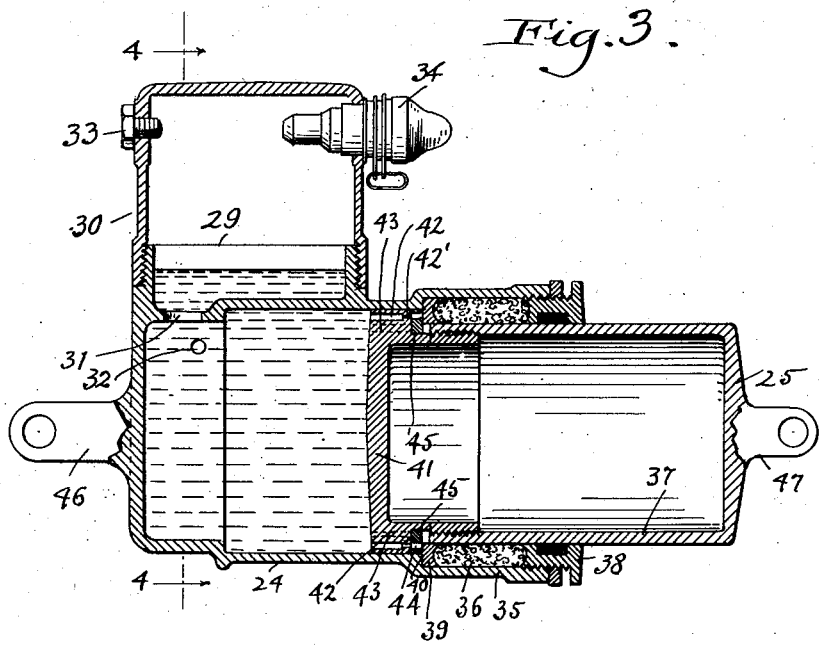
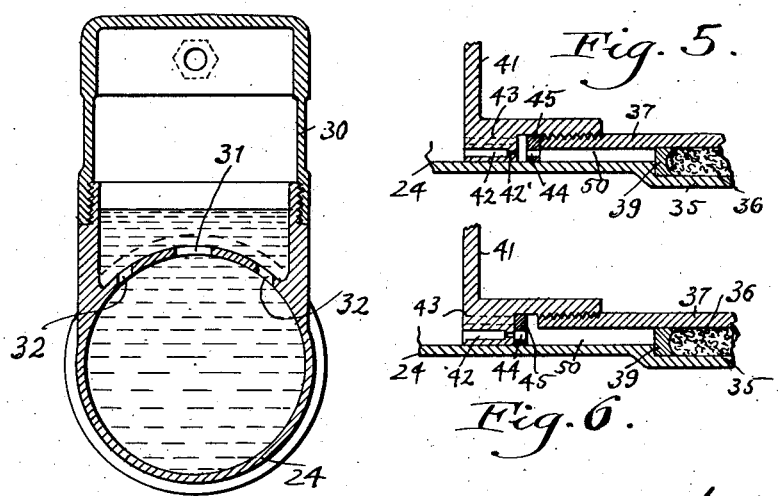

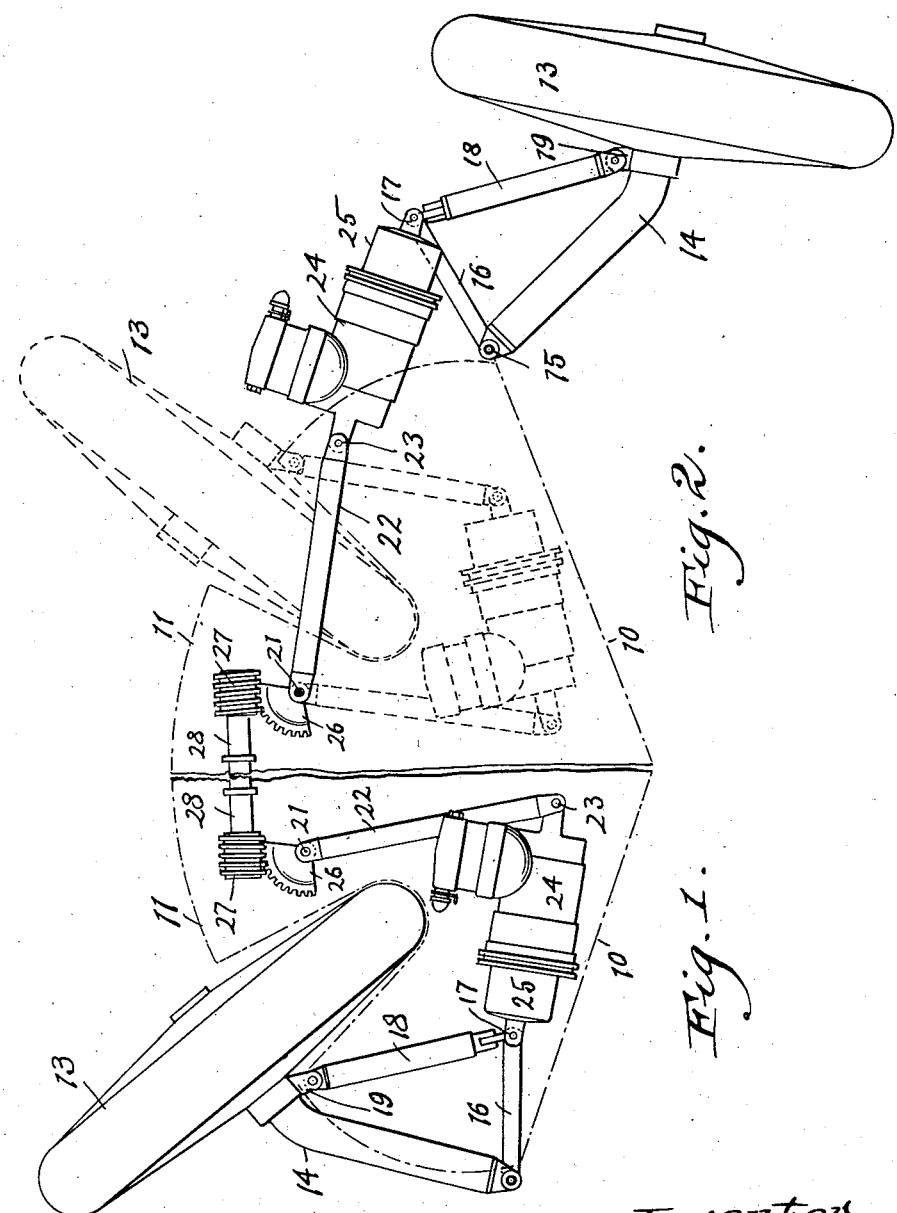

Patented Nov. 18, 1930

1,782,141

UNITED STATES PATENT OFFICE

LOUIS WILLIAM GREVE, OF CLEVELAND, OHIO, ASSIGNOR TO THE CLEVELAND PNEUMATIC TOOL COMPANY, OF CLEVELAND, OHIO, A CORPORATION OF OHIO

SHOCK ABSORBER

Original application filed April 30, 1928, Serial No. 273,929. Divided and this application filed July 26, 1929. Serial No. 381,178.

This invention relates to improvements in shock absorbers for air craft, particularly amphibians, being a division of my copending application, Serial No. 273,929, filed April 30, 1928. In air craft of this class the landing gear must be retracted at times when the plane is alighting upon the water. Otherwise the landing gear would be torn loose from the ship, because of the resistance offered by the relatively unyielding water through which the landing gear would have to pass rapidly. Consequently it is the general practice to mount the forward ground wheels upon movable frames or systems of links and levers and to arrange for their operation usually from the pilot's cockpit in order that the landing gear may be quickly and easily lowered into operative position or retracted whenever the occasion therefor arises.

This necessary movability of the landing gear and the relatively short pivotally mounted elements of the same which are employed to accomplish movability have rendered it difficult, if not impossible, to incorporate in the landing gear satisfactory shock absorbing means of the types in use upon airplanes, and as a result amphibians heretofore have generally been without efficient shock absorbing equipment, which obviously is detrimental to the rather delicate structure of such craft and a source of discomfort to the pilot and passengers.

One of the objects of the present invention, therefore, is the provision of efficient shock absorbing equipment for the retractable landing gear of amphibians.

Another object is the provision of a fluid shock absorber, to be employed in the landing gear of an amphibian as a part thereof, which ordinarily occupies a substantially horizontal position.

Another object is the provision of a combined liquid and air strut so designed and arranged that it will function properly and efficiently in a substantially horizontal position.

Another object is the provision of an air dome extending laterally from the cylinder of the shock absorber in a generally vertical direction, and so connected to the interior of the cylinder that in none of the positions assumed by the shock absorber in moving from operative to inoperative position and vice versa will air escape from the dome into the cylinder.

Other objects and features of novelty will appear as I proceed with the description of that embodiment of the invention which, for the purposes of the present application, I have illustrated in the accompanying drawings, in which, Figure 1 is a transverse sectional view extending approximately half way through the hull of an amphibian and illustrating a landing gear embodying my invention, said gear being in retracted position.

Fig. 2 is a similar view of the other half of the hull, with the corresponding portion of the landing gear shown in full lines in its operative position and in dotted lines in its inoperative position.

Fig. 3 is a central longitudinal sectional view through the shock absorber strut with the piston in extended position.

Fig. 4 is a transverse sectional view taken substantially on the line 4—4 of Fig. 3, and Figs. 5 and 6 are fragmental views illustrating the positions of the valve ring assumed when the piston is traveling inwardly and outwardly, respectively.

In Figs. 1 and 2 of the drawings the outline of the hull of an amphibian plane is indicated by dotted lines, the lower surfaces at 10 and the curved upper surface at 11, the hull on each side of the center being provided with a wall 12 for the reception of a portion of the wheel 13 of the landing gear when the latter is in its retracted position. The surfaces 11 of the hull are necessarily interrupted or cut into further for the accommodation of the bracing and retracting linkage presently to be described.

The wheels 13 are mounted for rotation upon axles 14 which are preferably bent substantially as shown in the drawings and attached at their inner ends by pivots 15 to the hull or its framework. A link 16 is also mounted upon the pivot 15 and at its other end is connected by a pivot 17 with one extremity of a link 18, the other extremity of the link 18 being pivotally attached to an ear 19 on the axle 14. The parts 14, 16 and 18 thus together constitute a triangular frame.

Mounted at fixed positions within the hull are a pair of pivots 21 upon which links 22 are mounted to swing. At the opposite ends these links carry pivots 23. Between the pivots 17 and 23 is mounted a shock absorber, which may, and preferably does comprise a cylinder element 24 and a piston element 25.

In order to accomplish the movement of the landing gear from operative position to retracted position and vice versa, any suitable means may be provided for swinging the link 22 upon the pivot 21. This is preferably accomplished, however, by providing the link 22 beyond the pivot 21 with a sector 26, the teeth of which mesh with a spiral gear 27, the two gears 27 being keyed upon a shaft 28 that may be rotated by any suitable means, not shown, such means being operable preferably from the pilot's cockpit.

Referring now to Figs. 3 and 4, wherein the detailed construction of the shock absorber is illustrated, it will be observed that the cylinder element 24 is provided upon its upper side near its closed end with an integral annular upwardly extending exteriorly threaded cup 29. This cup 29 has threadably mounted thereon a dome 30, the cup and dome together enclosing a chamber which is in communication with the cylinder near the closed end thereof by means of open ports 31 and 32. The dome is provided with an oil filler opening closed by a threaded plug 33 and with an air valve 34 of any usual construction.

The cylinder element 24 at its open end is provided with an enlargement 35 for the reception of packing 36 which surrounds the skirt 37 of the piston element 25. Into the end of the enlargement 35 there is threaded a packing gland nut 38. At the opposite end of the gland there is a packing retainer ring 39, which normally rests against the shoulder 40 formed between the cylinder 24 and its enlargement 35. This ring 39 may move away from the shoulder 40 to some extent in response to pressure communicated to it from the space within the cylinder beyond the piston head 41 by way of passages 42 and 43 through the piston head and ports 44 through a valve ring 45. By this means the packing 36 may be automatically compressed more or less to make it tight when the pressure is heavy and to permit it to loosen up when the pressure is relieved somewhat. This automatic regulation of the packing is disclosed more in detail in an application filed December 9, 1927 by John F. Wallace, Serial No. 238,838.

The head of the cylinder element 24 has a mounting lug 46 integral therewith, and a similar lug 47 is provided at the outer end of piston element 25, these lugs being provided with openings for the reception of pivots 23 and 17, respectively.

When the landing gear is in operative position and the machine is making a landing or when it is taxiing over the ground, the cylinder and piston 24, 25 together constitute a strut, in other words, they perform the usual function of a shock absorber. When the landing gear is being retracted, however, these two parts together constitute a tension element. At such times the head 41 of the piston presses through valve ring 45 against packing retainer ring 39, whereby the extension of the parts is stopped or limited.

Each of the passages 42 has a restriction 42' therein. The ring 45 is loosely mounted so as to float in the space between the overhanging portion of the piston head and the shoulder formed at the inner end of the piston skirt 37, the ports 44 in the ring being positioned to register with the passages 42 when the ring is in the position illustrated in Figs. 3 and 6. When the ring 45 is in the position of Fig. 5 the unrestricted passages 43 are open. When it is in the position of Fig. 6, however, these passages are closed.

The mounting of the shock absorber is, of course, such that the dome 30 extends above the cylinder 24. The plug 33 is removed and sufficient oil or other liquid is poured into the filler hole to entirely fill the space within the cylinder and extend up into the dome to about the level illustrated in Fig. 3, when the piston is extended as far as it will go, that is, when it is in the position illustrated in Fig. 3. Air is then pumped into the dome through the air valve 34 until the desired pressure is reached. This air is trapped in the dome where it acts upon the surface of the liquid, and a considerable amount of tilting of the shock absorber upon its mountings may occur without permitting any air to get into the cylinder 24. It is relatively easy to maintain substantially oil tight sliding surfaces between the cylinder and piston, but quite difficult to make such joints tight against the escape of compressed air. I have so positioned the ports 31, 32, however, that when the piston end of the shock absorber is elevated, so that air would tend to collect at the sliding surfaces, the oil above ports 31, 32 is relatively deep. Consequently there is little opportunity for air to escape from the dome 30 and pass through ports 31, 32 into the cylinder, even though the oil washes about considerably due to shocks transmitted from the ground wheels.

*Operation.*—Assuming that the landing gear is in operative position, as shown in Fig. 2 and that the plane is on the ground, the weight of the plane is transmitted to the ground wheels 13 through the shock absorbers, and consequently the pistons 41 are advanced in the cylinders 24 to such an extent that the compression of the air in the domes 30 balances the weight of the plane. Now when the plane takes off and its weight is removed from the struts, the pressure in the domes 30 expands the struts to the limit, that is until the pistons 41 engage the retainer rings 39 through the intermediacy of the valve rings 45. By this means the rings 39 are moved slightly, thereby expanding the packing 36. A tight seal is thus formed between the two telescoping members 24 and 25 when the plane is in the air.

When a landing is made the landing gear strikes the ground with considerable force. This force causes the piston head 41 in each strut to move inwardly in the cylinder 24, and this movement is transmitted by the oil into the dome 30, where it acts to compress the air therein. During this stroke the ring 45 is in the position of Fig. 5, and a minimum resistance is offered to the flow of oil through passages 43 and 42 and through the ports 44 into the annular space 50 behind the piston head.

When the force of the impact is balanced by the pressure built up in the dome 30, the piston stops and the energy thus stored up in the highly compressed air in the dome tends to drive the piston outwardly with a violent motion. The piston head immediately catches up with the loose valve ring 45, as indicated in Fig. 6, and the latter is held in this position by the pressure of the oil behind it. Consequently the passages 43 are closed and the oil from the annular passage 50 is permitted to flow out past the piston head only so fast as it can be metered through the restrictions 42' in the passages 42. The rebound is thus slowed up. At the same time, however, the oil in the annular space 30 is put under heavy pressure, and this pressure is communicated to the retainer ring 39, moving the latter outwardly and compressing the packing 36, whereby increased friction assists in slowing up the rebound action.

While I have illustrated and described the invention in considerable detail, such detail disclosure has been resorted to primarily for illustrative purposes, and is not to be construed as limiting the invention except as it may be included specifically in the appended claims.

Having thus fully described my invention, I claim:

1. In a shock absorbing strut for aircraft, a cylinder, a piston therefor, means for mounting said cylinder and piston to have a substantially horizontal operative position, a dome extending upwardly from said cylinder in the operative position of the latter, said dome being in communication with the cylinder near the closed end thereof beyond the innermost position of the piston, said strut containing a quantity of liquid sufficient to fill a portion of the dome and all of the cylinder in the expanded position of the strut, and containing also a quantity of compressed air, said piston behind the piston head being shaped to provide an annular chamber between the piston and cylinder, and means for permitting relatively free flow of liquid into said annular chamber upon the forward stroke of the piston and restricted flow out of said chamber when the piston moves in the opposite direction.

2. In a shock absorbing strut for aircraft, a cylinder, a piston therefor, means for mounting said cylinder and piston to have a substantially horizontal operative position, a dome extending upwardly from said cylinder in the operative position of the latter, said dome being in communication with the cylinder near the closed end thereof beyond the innermost position of the piston, said strut containing a quantity of liquid sufficient to fill a portion of the dome and all of the cylinder in the expanded position of the strut, said piston behind the piston head being shaped to provide an annular chamber between the piston and cylinder, the piston head having ports therethrough opposite said annular chamber, and valve means adapted to close certain of said ports when the piston moves rearwardly only.

In testimony whereof, I hereunto affix my signature.

LOUIS WILLIAM GREVE.